United States Patent [19]

Warren et al.

[11] Patent Number: 4,830,807
[45] Date of Patent: May 16, 1989

[54] METHOD OF MAKING A MOUNTING DISK FOR A FLOOR POLISHER

[76] Inventors: William L. Warren, Rte. 4-Steeleberry La.; Mark V. Warren, 5808 Piney Top Dr., both of Charlotte, N.C. 28208

[21] Appl. No.: 98,974

[22] Filed: Sep. 21, 1987

Related U.S. Application Data

[62] Division of Ser. No. 885,858, Jul. 14, 1986, Pat. No. 4,709,439.

[51] Int. Cl.⁴ .................... B29C 45/00; B29C 71/02; B32B 31/00
[52] U.S. Cl. .................... 264/235; 264/250; 264/262; 264/274; 264/328.8
[58] Field of Search ............. 264/346, 235, 250, 262, 264/274, 279, 328.7, 328.8

[56] References Cited

U.S. PATENT DOCUMENTS

| | | |
|---|---|---|
| 2,648,178 | 8/1953 | Lyon . |
| 3,056,988 | 10/1962 | Clarke . |
| 3,172,142 | 3/1965 | Garth . |
| 3,183,542 | 5/1965 | Anders . |
| 3,395,417 | 8/1968 | Matouka . |
| 3,462,889 | 8/1969 | Erickson . |
| 4,307,480 | 12/1981 | Fallen . |
| 4,322,866 | 4/1982 | Brazzale . |
| 4,385,025 | 5/1983 | Salerno et al. ............. 264/262 X |
| 4,541,207 | 9/1985 | Antonson . |
| 4,598,440 | 7/1986 | Wilson ............. 15/230.18 X |

FOREIGN PATENT DOCUMENTS

| | | | |
|---|---|---|---|
| 59-54513 | 3/1984 | Japan ............. | 264/235 |
| 60-154037 | 8/1985 | Japan ............. | 264/250 |

*Primary Examiner*—Jeffery Thurlow
*Assistant Examiner*—Leo B. Tentoni
*Attorney, Agent, or Firm*—Bell, Seltzer, Park & Gibson

[57] ABSTRACT

A method of forming a floor polisher mounting disk is provided which includes the steps of injection molding plastic hub and rim portions, annealing the plastic hub and rim portions, and therafter injection molding a relatively soft plastic material to overlie and interconnect the plastic hub and rim portions.

3 Claims, 3 Drawing Sheets

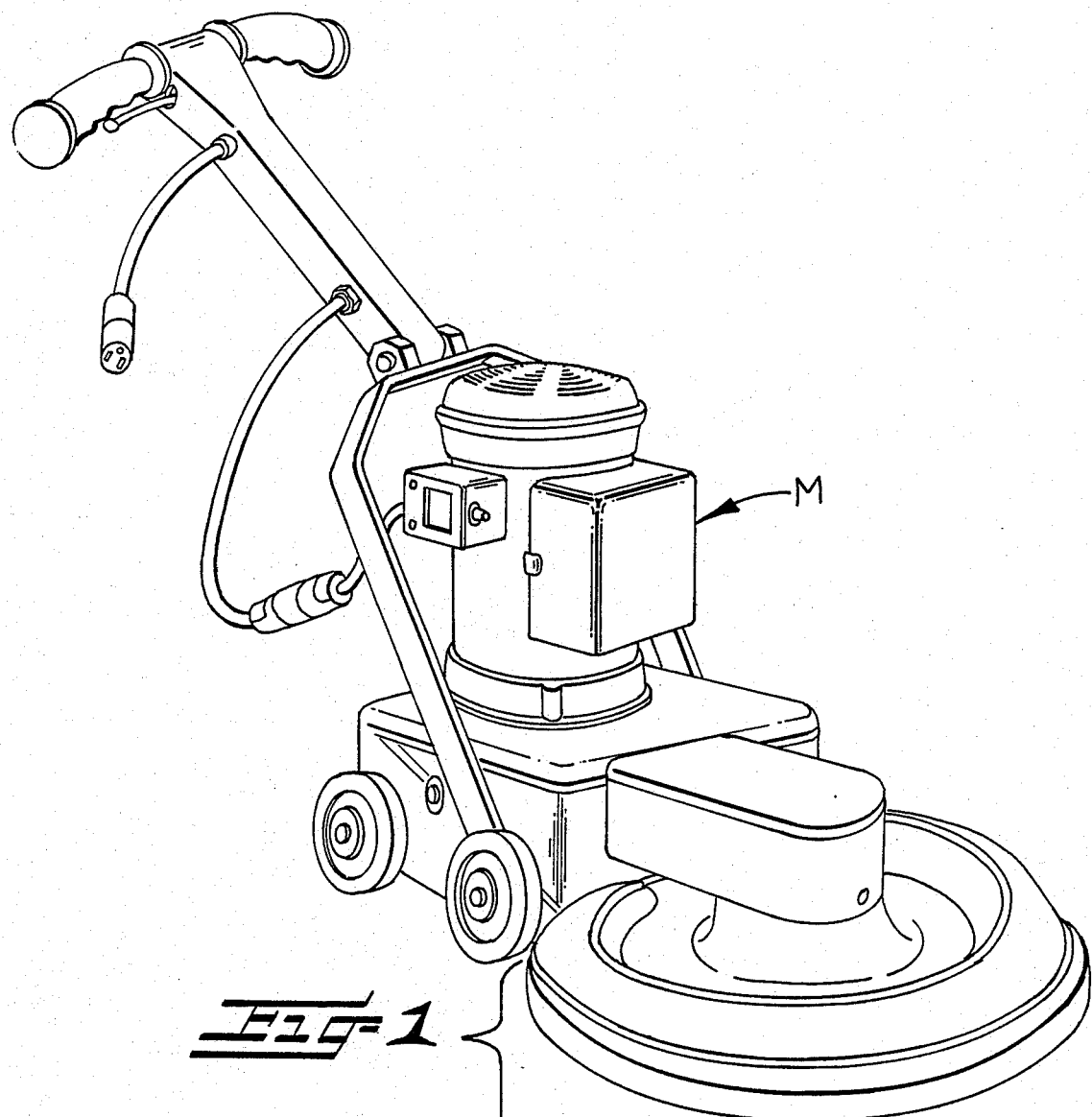
Fig-1
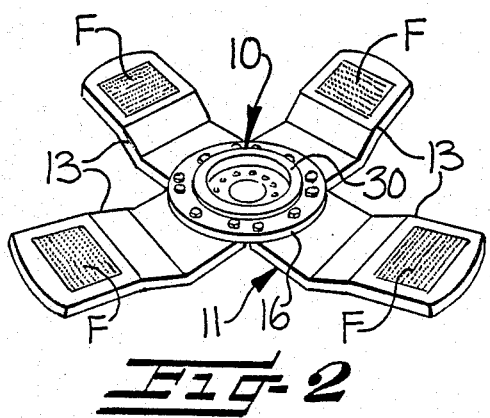
Fig-2
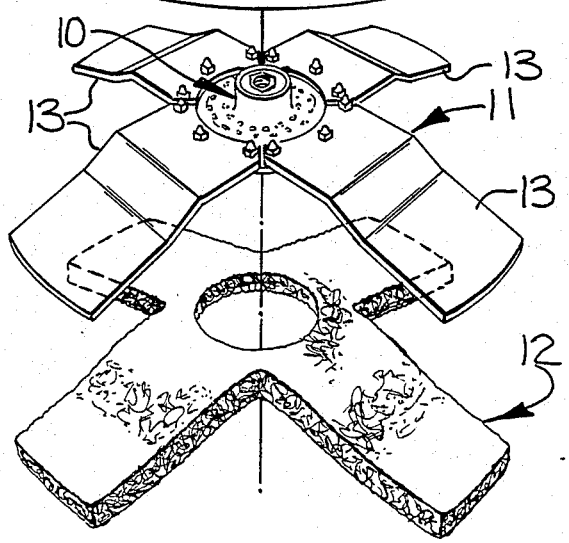

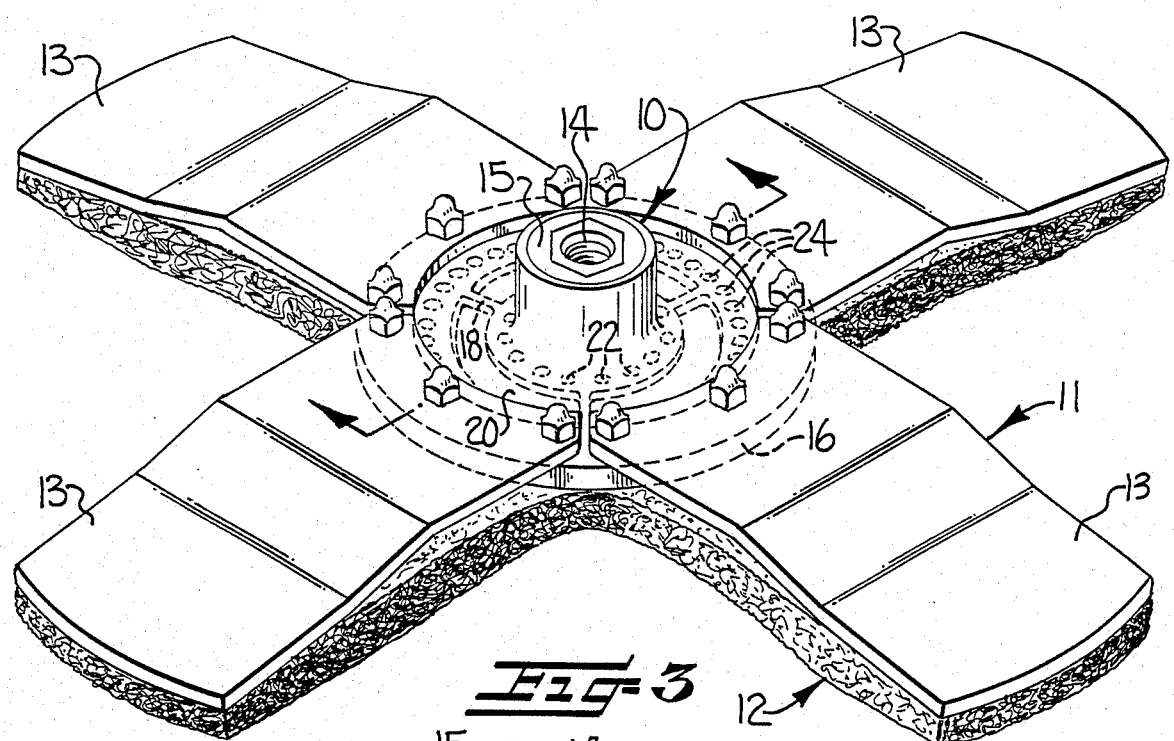
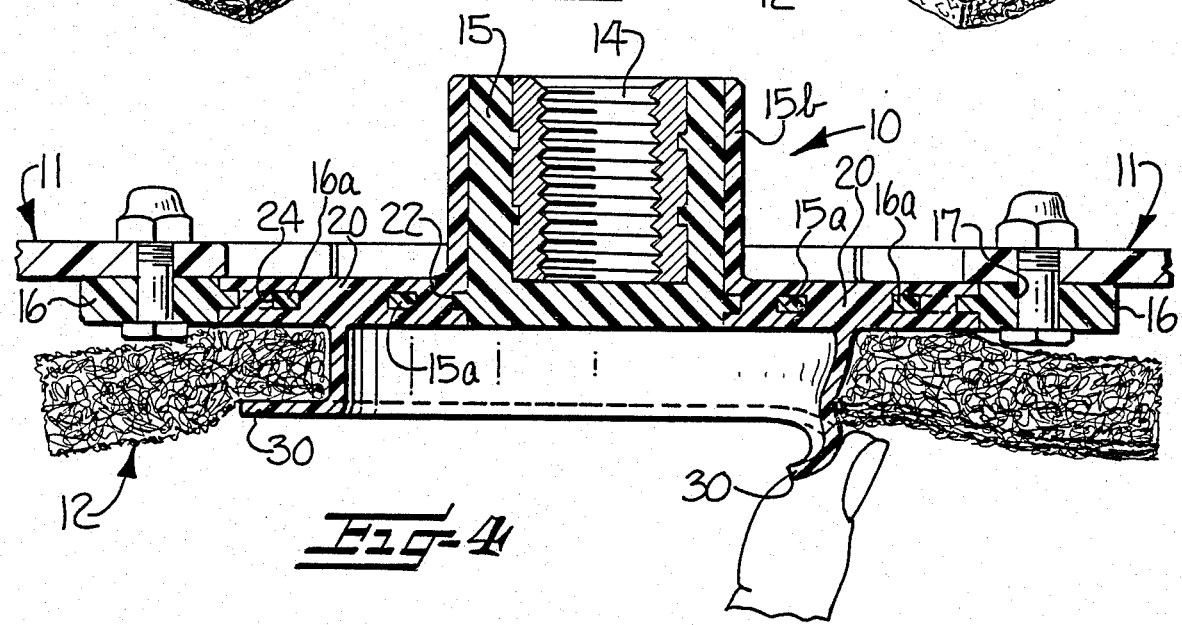
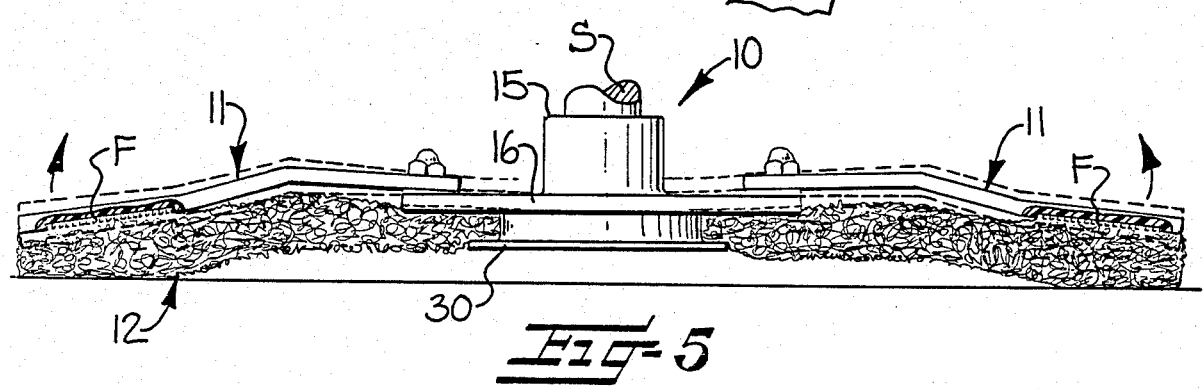

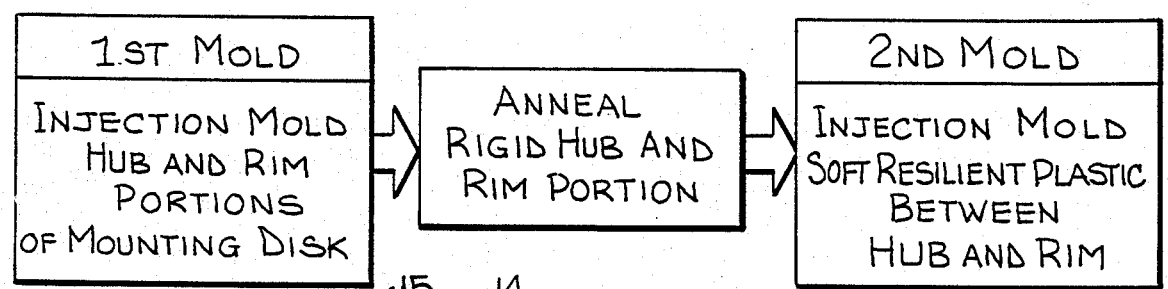
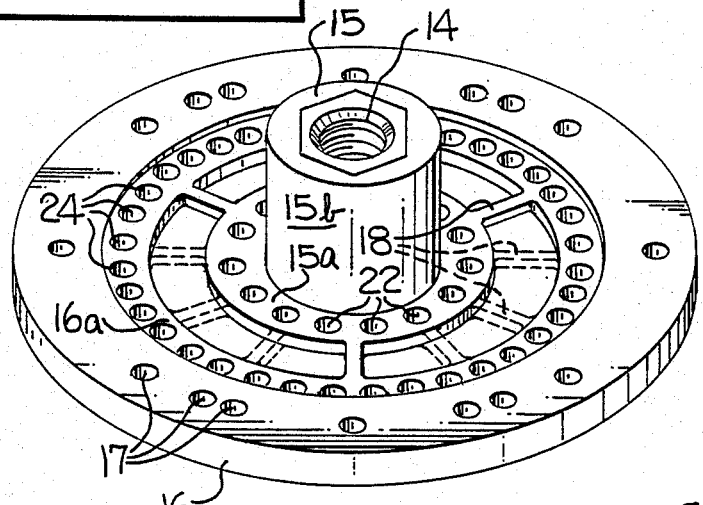
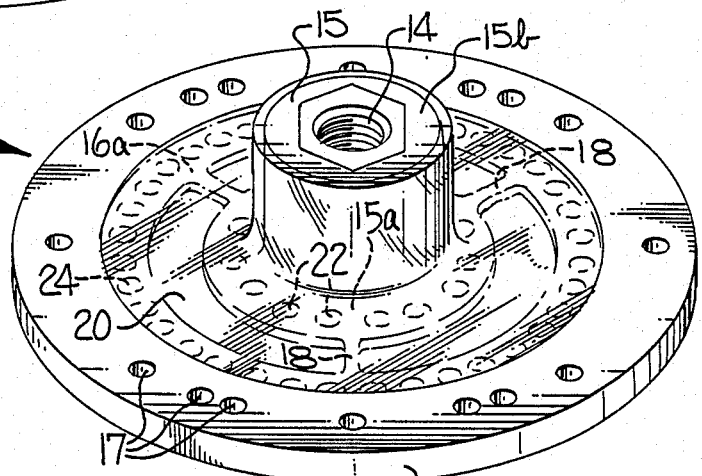
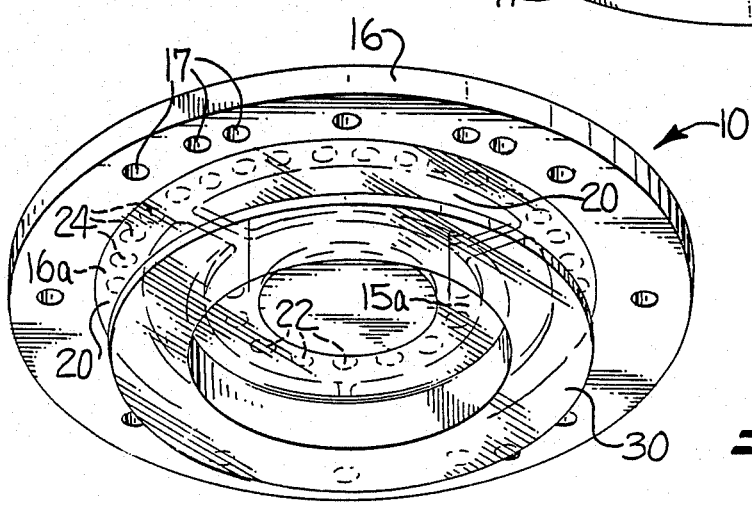

METHOD OF MAKING A MOUNTING DISK FOR A FLOOR POLISHER

This application is a division of copending application Ser. No. 885,858, filed July 14, 1986, now U.S. Pat. No. 4,709,439.

BACKGROUND OF THE INVENTION

This invention relates to a mounting disk for use in mounting a floor polishing pad on a motorized floor polishing machine The invention also relates to a method of forming the mounting disk through a molding process which provides an integral mounting disk formed from disparate plastic starting materials to provide an improved composite product having improved strength properties as well as enhanced resiliency.

Industrial floor polishers have been in use for many years in the industrial setting for scrubbing or polishing large commercial areas. These apparatuses are typically electric powered in smaller applications but may also be gas powered, and typically by liquid propane, for use in settings where greater horsepower is desired.

Floor polishers typically include a driven shaft which receives an attachment for brushing or polishing floor surfaces. The attachment may take the form of a brush having heavy duty bristles as is illustrated, for example, in U.S Pat. Nos. 3,172,142 and 3,183,542. As discussed in these patents, a polishing pad is applied directly to hhe bristles or may be securely held in position by a pad holder which includes an outer flange providing a lip which exerts force on the polishing pad to maintain the frictional engagement between the pad and the bristles. Alternatively, and as shown in U.S. Pat. No. 4,307,480, the positioning of the polishing pad may be maintained by a supporting structure in which the pad is sandwiched between two members with the upper member providing the backup for the polishing pad; a function which would alternatively be provided by the bristles on the brush as described above.

A common shortcoming of the devices for mounting the polishing pad is the inability of the mounting disk to provide for a sufficient degree of flexure in the pad so that the polishing pad maintains contact with the floor on encountering uneven surfaces such as a door threshold or the like. The apparatuses disclosed in the U.S. Pat. Nos. 3,172,142 and 3,183,542 rely on the flexiblity of the bristles which must be compressed in order to provide any flexure for the pad upon encountering a protuberance on the surface of the floor. Since these bristles typically have a high level of stiffness, the pad will generally be subjected to extreme wear and rapid deterioration when a threshold or the like is contacted with the polishing pad.

Efforts to provide for flexibility at the peripheral areas of a polishing pad are represented by U.S. Pat. No. 3,395,417, for example, which describes a multilayered structure in which a pad made of soft urethane foam is joined to a plate which is stiffer than the pad. As noted in U.S. Pat. No. 4322,866, however, difficulties have been encountered with this structure due to the glue interfaces between the foam and the surface of the disk in the multi-layered constructions. This patent also notes that a problem is encountered in the use of soft polystyrene composite devices because of a tendency for the disk to wobble in use. To this end, the latter patent advocates the use of an elastomeric disk with a thick central zone and a relatively thin peripheral zone.

The annular portion is formed of elastomeric material, and particularly rubber having a specified durometer hardness. An annular groove is also provided on the periphery of the attachment in an effort to provide the desired flexibility in the peripheral areas. The provision of the groove however significantly reduces the strength of the attachment in this critical region particularly since the periphery will absorb all of the resulting stresses as portions of the polisher engage an uneven surface during polishing.

It is therefore an object of the present invention to provide a mounting disk for mounting a polishing pad on a floor polisher of the type described which provides the desired resiliency, but which also possesses significant strength properties in order to avoid rapid deterioration of the mounting disk. It is also an object of the invention to provide a mounting disk having an annular, unitary lip for maintaining the pad in engagement against a backing member.

It is also an object of the invention to provide a method of fabricating a floor polisher mounting disk which provides the desired resilient properties through the composite structure disclosed hereinbelow but which is substantially unitary to provide a disk having improved strength properties as well.

SUMMARY OF THE INVENTION

The foregoing objects are achieved in the present construction for a mounting disk which includes a plastic hub portion and a plastic rim portion encircling the hub portion and in spaced relation thereto. Resilient plastic means interconnect the hub and the rim so as to provide a pliable interconnecting structure between the hub and the rim. The composite structure provides a strong hub and rim area of high rigidity while the stresses created when a threshold or other disturbance is encountered are accommodated by the more flexible yet resilient plastic interconnecting the two elements. Moreover, the disk preferably includes a concentrically arranged annular lip which is spaced apart from the rim to define a groove for receiving the polisher pad. The lip is preferably integrally molded with the resilient plastic means and is desirably made of the same material in order to cooperate with the body of the mounting disk to provide an even higher degree of flexure when an uneven surface is encountered during use. In addition, the annular lip is sufficiently pliable to ease insertion of the lip through the aperture provided in a polishing pad in order to mount the pad, but is sufficiently resilient to maintain the engagement between the pad and a backing member or assembly fastened to the rim portion.

In accordance with the method disclosed herein, the hub and the rim portions are injection molded in a first mold from a relatively rigid plastic material such as nylon. The resulting part is then annealed, followed by a subsequent molding stage in which a relatively soft plastic material is molded in and between the hub and rim so that the resulting product has the requisite degree of flexibility when an upward force is exerted at the rim, for example, upon encountering a threshold or the like in actual use. In addition, the resulting composite structure will have excellent strength properties notwithstanding the use of the relatively soft urethane. Also, a unitary lip may be integrally molded from the same soft plastic material in the second stage to provide a unitary lip which cooperates with the hub and rim portions to provide enhanced flexibility as well.

IN THE DRAWINGS

Additional features and advantages of the invention will be described in detail hereinbelow in connection with the drawings in which:

FIG. 1 is an exploded perspective view of a motorized floor polishing machine equipped with the mounting disk of the present invention;

FIG. 2 is bottom perspective view of the mounting disk shown in FIG. 1 including a backing member for the polishing pad comprised of radially extending arms;

FIG. 3 is a perspective view on an enlarged scale of the mounting disk equipped with the backing member and with a polishing pad mounted thereon;

FIG. 4 is a side elevation view of the complete assembly depicted in FIG. 3 in cross-section taken along line 4—4 in FIG. 3 and further depicting the resiliency of the annular lip which facilitates the mounting or removal of the polishing pad on or from the mounting disk;

FIG. 5 is a further side elevation view of the assembly including the polishing pad with sections of the pad and backing member removed to expose portions of the annular lip and depicting the cooperation between the mounting disk and backing member to maintain the outer peripheral portions of the polishing pad in contact with the floor;

FIG. 6 is a schematic view of the various steps comprising the method of forming the novel mounting disk in accordance with the present invention;

FIG. 7 is a top perspective view depicting the intermediate product formed in the first molding stage in accordance with the method steps depicted in FIG. 6;

FIG. 8 is a top perspective view of the mounting disk following the completion of the second molding stage in accordance with the method disclosed herein; and FIG. 9 is a bottom perspective view of the mounting disk hown in FIG. 8.

BRIEF DESCRIPTION OF THE PREFERRED EMBODIMENTS

As shown in FIG. 1, a floor polishing machine M, which may be gas or electric powered, is provided with a mounting disk 10 and a backing member 11 which is preferably formed from a plurality of radially extending arms 13 which are arranged about the periphery of the mounting disk 10 to provide an X-configuration (FIG. 2). The mounting disk 10 and backing member 11 may be mounted on a suitably threaded drive shaft which extends from the polishing machine M. In accordance with the present invention, a polishing pad 12 may be positioned on the mounting disk 10 without necessitating the removal of any parts from the mounting disk 10 or backing member 11. As shown in FIG. 4, and as more particularly described below, the polishing pad 12 is primarily held in position by an annular lip 30 but, and to this end, it is also preferable to provide a plurality of hook means or fasteners F (FIG. 2) which are attached to the arms 13 of the backing member 11 and which in turn engage peripheral portions of the pad 12 to hold the same securely in position as the mounting disk 10 and backing member 11 are rotated in actual use. The assembled mounting disk 10, backing member 11 and pad 12 are shown in an enlarged scale in FIG. 3.

As shown in FIG. 4, the mounting disk 10 of the present invention includes a hub portion 15 preferably including a threaded metal nut 14 for receiving a complimentary threaded member on the drive shaft S (FIG. 5) of a polishing machine M. In addition, a rim portion 16 is also provided which encircles the hub 15 in spaced relation thereto (FIGS. 7 and 8). The rim portion 16 preferably includes a plurality of apertures 17 extending therethrough which are distributed about the rim 16 in a predetermined configuration for removably connecting the radial arms 13 of the backing member 11 to the mount::ng disk 10. The apertures 17 are preferably arranged in such a manner which permits mounting of the radial arms 13 in an essentially pre-balanced arrangement to minimize the burdens of balancing the same.

Both the hub portion 15 and the rim portion 16 are preferably formed from a material, and preferably a plastic material having relative high stiffness and strength properties such as nylon 6,6. In addition, the hub portion 15 and rim portion 16 are preferably joined by radially extending connectors 18 (FIG. 7) both for enhancing the precision of the molding process as described below and in order to enhance the overall strength properties of the disk 10.

The hub portion 15 and rim portion 16 are interconnected by resilient plastic means 20 and preferably comprising polyurethane of a suitable hardness as measured by a durometer. The thickness and hardness of the resilient plastic means 20 may be varied over a wide range depending particularly upon the degree of flexibility possessed by the backing member 11. For example, a hardness of 80 for the polyurethane has been found to be satisfactory for use in connection with a conical backing member (not shown) such as those used conventionally in connection with various polishing machines and where a greater degree of flexibility in the mounting disk 10 may be desired. On the other hand, in the embodiments using the preferred backing member 11 formed of radially extending arms 13, a higher degree of hardness as measured by a durometer of a magnitude of 90 can be satisfactorily utilized since the arms 13 have a somewhat greater degree of flexibility than the relatively stiffer conical backing member.

In order to provide structural integrity for the mounting disk 10, the hub portion 15 preferably includes a thick upstanding sleeve portion 15b and a relatively thin annular portion 15a. In a similar fashion, the rim 16 preferably includes a thin annular portion 16a extending from the rim 16 in a direction toward the hub 15. The two thin annular portions 15a and 16a are preferably provided with a series of apertures 22 and 24 respectively (FIG. 7) so that the resilient plastic means 20 may flow into and through the apertures during the molding process to thereby overlie portions of the hub 15 and rim 16 and securely bond the two members to each other (FIG. 8). As noted above, the radially extending connectors 18 assist in augmenting this function as well as to ensure superior strength properties for the composite structure particularly since the mounting disk 10 may be used at speeds of over 2000 revolutions per minute on known gas powered floor polishers equipped with eleven horsepower motors. The connectors 18 are preferably of the same thickness as the relatively thin annular portions 15a and 16a.

The mounting disk 10 also includes a concentrically arranged annular lip 30 (FIG. 4) which is preferably integrally formed together with the resilient plastic means 20 from polyurethane. The annular lip 30 and the rim 16 define a groove therebetween for receiving the inner peripheral portions of a polishing pad which is in turn securely held therebetween with the outer peripheral portions of the pad 12 being engaged by portions of the arms 13 of the backing member 11. The lip 30 is preferably sufficiently flexible to accommodate temporary distortions so that corresponding portions thereof may be inserted through the concentric aperture in a polishing pad 12 (FIG. 4). In this fashion, a totally integral construction is provided which possesses significant advantages over known removable lips or collars which correspondingly carry an attendant risk of accidental loss or dislodgement during operation of the polishing machine M, and particularly at higher operating speeds. The preferred relatively resilient integral lip 30 also cooperates with the resilient plastic means 20 to enhance the overall properties of the mounting disk 10 to maintain the pad 12 in engagement with the floor when portions thereof contact a raised surface such as a threshold in actual use with corresponding displacement of the arms 13 of the backing member 11 (see arrows in FIG. 5).

In accordance with the novel method for forming the mounting disk 10, the hub 15 and rim 16 are preferably concurrently formed in a first molding stage performed in an injection molding apparatus (FIG. 6). As noted above, these portions are preferably joined by radially extending connectors 18 which are preferably concurrently formed with the hub 15 and rim 16 in the same injection molding stage. These connectors 18 not only enhance the finished strength properties of the disk 10, but also provide a unitary part, as shown in FIG. 7 which eases the subsequent handling and provides precision in the subsequent molding stage. The die is preferably fabricated so as to also provide the thin annular portions 15a of the hub 15 and 16a of the rim 16 as well as the apertures 17, 22, and 24 in the intermediate part (FIG. 7). In addition, the threaded metal nut 14 is preferably inserted in the die prior to the first molding stage so that the nut is encased in the preferred nylon starting material while forming the thick sleeve portion 15b of the hub 15.

At the conclusion of the first molding stage, the resulting molded nylon part is trimmed, if necessary, to remove any excess material whereupon the preferred unitary member is annealed to toughen the nylon by reducing the brittleness of the nylon and preferably by placing the member in boiling water for three to four hours.

Following the annealing of the intermediate product, the part resulting from the first molding stage is inserted in a second die in order to form the resilient plastic means 20 as well as the lip 30 from the preferred plastic material, polyurethane. As illustrated, the polyurethane will preferably encase the relatively hard nylon sleeve portion 15b in a layer of soft polyurethane to further protect the sleeve portion 15b against blows which might otherwise chip or cut the nylon. In addition, the polyurethane preferably flows through the series of apertures 22 and 24 in the thin annular portions 15a and 16a respectively to overlie and encase those portions in the urethane to securely bond the hub 15 and rim 16 to each other. Also, the molding should be performed in a manner which avoids any flow of the polyurethane into the apertures 17 in the rim 16 so that their integrity is preserved in the finished product (FIGS. 8 and 9).

As noted earlier, the lip 30 is preferably integrally formed with the resilient plastic means 20 to provide durability and strength while at the same time providing a lip 30 which cooperates with the resilient plastic means 20. The resulting finished product is shown in FIGS. 8 and 9.

The mounting disk 10 formed in accordance with the method described herein will possess excellent srrength properties including high strength at the rim 16 for attaching the arms 13 of backing member 11, while also providing the desired stability and flexibility. The mounting disk 10 and method therefore provide significant advantages over those heretofore known in the art.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of forming a floor polisher mounting disk for use in connection with a motorized polishing machine and comprising the steps of injection molding, of a relatively rigid plastic material, a plastic hub portion having a relatively thin annular portion of reduced thickness formed integral therewith and extending outwardly from the base of the hub portion and a plastic rim portion of a size so as to encircle the hub portion, said rim portion having a relatively thin annula portion of reduced thickness formed integral therewith and extending inwardly in opposing relation to said reduced thickness annular portion on said hub portion, thereafter annealing the injection molded portions to toughen the plastic material thereof, placing the annealed molded portions in a mold and injection molding a relatively soft plastic material to overlie and interconnect the hub and rim portions and to encase the reduced thickness annular portions of said hub and rim portions while concurrently forming a unitary lip positioned on the opposite side of the disk from the hub portion so as to provide a flexible but unitary lip member to form a mounting disk of unitary construction with rim portions that will readily flex to facilitate movement of the polisher over raised portions along the floor.

2. A method according to claim 1 wherein said step of injection molding a relatively soft plastic material includes forming the soft plastic material so as to overlie and encase a substantial portion of the hub portion.

3. A method according to claim 1 wherein the step of injection molding relatively soft plastic material comprises molding a polyurethane plastic having a durometer hardness of 90.

* * * * *

UNITED STATES PATENT AND TRADEMARK OFFICE
CERTIFICATE OF CORRECTION

PATENT NO. : 4,830,807
DATED : May 16, 1989
INVENTOR(S) : William L. Warren et al.

It is certified that error appears in the above-identified patent and that said Letters Patent is hereby corrected as shown below:

IN THE SPECIFICATION:

Column 1, line 30, delete "hhe" and insert --the--.

Column 1, line 60, delete "4322,866" and insert --4,322,866--.

Column 3, line 38, delete "hown" and insert --shown--.

Column 4, line 8, delete "mount::ng" and insert --mounting--.

IN THE CLAIMS:

Column 6, line 34, delete "annula" and insert --annular--.

Column 6, line 55, after "molding" insert --a--.

Signed and Sealed this

Thirteenth Day of February, 1990

Attest:

JEFFREY M. SAMUELS

*Attesting Officer*    *Acting Commissioner of Patents and Trademarks*